United States Patent
Sägfors et al.

(10) Patent No.: US 8,271,013 B2
(45) Date of Patent: Sep. 18, 2012

(54) METHOD AND ARRANGEMENT FOR TRANSMITTING CQI ON THE UPLINK

(75) Inventors: Mats Sägfors, Kyrkslätt (FI); Stefan Wager, Espoo (FI); Janne Peisa, Espoo (FI); Johan Torsner, Masaby (FI); Muhammad Kazmi, Bromma (SE); Afif Osseiran, Kista (SE)

(73) Assignee: Telefonakbolaget L M Ericsson (Publ), Stockholm (SE)

( * ) Notice: Subject to any disclaimer, the term of this patent is extended or adjusted under 35 U.S.C. 154(b) by 131 days.

(21) Appl. No.: 12/443,764

(22) PCT Filed: Oct. 31, 2007

(86) PCT No.: PCT/EP2007/009486
§ 371 (c)(1), (2), (4) Date: Mar. 31, 2009

(87) PCT Pub. No.: WO2008/052780
PCT Pub. Date: May 8, 2008

(65) Prior Publication Data
US 2009/0323541 A1   Dec. 31, 2009

(30) Foreign Application Priority Data
Oct. 31, 2006   (SE) ..................................... 0602299

(51) Int. Cl.
*H04B 7/00* (2006.01)
*H04B 7/185* (2006.01)
(52) U.S. Cl. ...................................... 455/522; 455/13.4
(58) Field of Classification Search .................. 370/311, 370/338, 350, 389; 455/13.4, 24, 522
See application file for complete search history.

(56) References Cited

U.S. PATENT DOCUMENTS

| | | | |
|---|---|---|---|
| 7,634,289 B2 * | 12/2009 | Gervais et al. | 455/522 |
| 7,720,504 B2 * | 5/2010 | Murata et al. | 455/550.1 |
| 2004/0198294 A1 * | 10/2004 | Hagin-Metzer | 455/296 |
| 2006/0281414 A1 * | 12/2006 | Lindoff et al. | 455/67.11 |
| 2007/0097914 A1 * | 5/2007 | Grilli et al. | 370/329 |
| 2007/0177555 A1 * | 8/2007 | Brueck et al. | 370/338 |
| 2008/0004062 A1 * | 1/2008 | Nibe | 455/519 |
| 2008/0009320 A1 * | 1/2008 | Rikkinen et al. | 455/560 |
| 2008/0056227 A1 * | 3/2008 | Love et al. | 370/343 |
| 2008/0062932 A1 * | 3/2008 | Hwang | 370/331 |
| 2010/0284326 A1 * | 11/2010 | Oh | 370/328 |

FOREIGN PATENT DOCUMENTS
EP   1304900 A   4/2003

\* cited by examiner

*Primary Examiner* — Michael Thier
*Assistant Examiner* — Awet Haile (57) ABSTRACT

A method for transmitting data flows between a network element and a number of receivers over a first channel. The method comprises the steps of: performing a link adaptation for the transmission of a data flow by said network element, and transmitting the data flow, transmitting an indication of a channel quality required for reception of the data flow on a second channel, receiving by said receivers said indication of channel quality, measuring a link quality by said receivers by monitoring a pilot channel, comparing said measured link quality with said received indication of the channel quality, and transmitting to said network element result of said comparison of said measured link quality with said received indication of the channel quality, if said result is lower than a predetermined value. The invention also relates to a network element and a user equipment.

13 Claims, 3 Drawing Sheets

METHOD AND ARRANGEMENT FOR TRANSMITTING CQI ON THE UPLINK

TECHNICAL FIELD

The present invention relates to telecommunications system in general and wireless communication systems. In particular, the invention relates to link adaptation for broadcast services.

BACKGROUND

In the frame of the 3GPP HSPA evolution work, there are initiatives to extend the use of the HS-DSCH (High-Speed Downlink Shared Channel) downlink shared transport channel. Improvements are being made to the Cell_FACH and UTRAN (UMTS Terrestrial Radio Access Network) paging states. Targets are extensive use of the HS-DSCH transport channel in the aforementioned states.

There are several incentives for extending the use of the HS-DSCH channel. In particular, it is note that the current common channels (PCH, FACH and BCH) are mapped on physical channels that consume both codes and power. If (parts of) this common channel traffic can be mapped onto HS-DSCH, then static code and power reservation can be avoided and a more flexible system can b achieved. This would particularly be true in, for example a 5 MHz band where only "evolved HSPA" UEs (User Equipments) would be served, i.e. in a situation where the operator keeps "legacy" UEs (that need a secondary CCPCH) in a different band.

An equally important benefit of the HS-DSCH channel is its flexibility. Compared to current FACH, much higher bitrates can be achieved over HS-DSCH, which would facilitate shorter channel setup-times. Long delays in channel setup (state changes) are one of the main performance bottlenecks in today's WCDMA system.

However, a problem with the present FACH realization is that it lacks means for link adaptation. In other words: since the FACH must reach all UEs in the cell, the modulation, coding and power has to be set in a conservative manner so that the FACH channel can be heard at the cell edge. This means that the FACH channel consumes a lot of resources, since it needs to be designed with the worst-case in mind. Observe that the FACH channel is currently the point-to-multipoint channel used for MBMS (Multimedia Broadcast and Multicast Service).

The HS-DSCH has support for advanced link adaptation. However, this is true only in Cell_DCH state, because the link adaptation relies on (frequent) link quality reporting (CQI— Channel Quality Indicator) in the uplink: The UE estimates the downlink quality based on DL pilots and send CQI reports to the Node B. Based on the CQI, the Node B can then select the most appropriate resource allocation, where this resource allocation can be chosen in the dimensions of:
1. modulation & coding (reflected in the selected Transport Format)
2. power (i.e. how much of the power resource is used for this transmission)
3. number of codes (number of HS-PDSCH physical channels) used for the transmission.

The CQIs are sent over the UL HS-DPCCH, which is available in Cell_DCH only.

Thus, the Node B has several degrees of freedom in how to respond and act to a certain CQI reported by an UE. For example, for a fixed CQI (link quality) the Node B could either a.) use less codes, less power, but strong modulation and coding, or
b.) use more codes, more power but weaker modulation and coding.

This choice could depend on the resource situation in the Node B—depending e.g. on whether the cell is code or power-limited.

In the UTRAN paging and FACH states there are, however, very limited means to provide any uplink (CQI) feedback to the network. The HS-DPCCH is not there. Due to the costs of maintaining links for dedicated CQI reporting in the UL, it does not appear feasible to implement such elaborate link adaptation in FACH/paging states. The cost of maintaining an uplink for transmitting reports is simply too high considering that the UEs are supposed to be quite idle in Cell_FACH/paging states.

Although, in the description above, a very specific technology implementation, i.e. the ongoing work with the Cell_FACH state in 3GPP, is discussed, the problem and the solution, however, are easily extended to any access technology. In particular and for example the LTE work where there is an equal need to have adequate forward-access link-adaptation particularly for MBMS, but possibly also for System Broadcast Information, Paging etc.

It is known, e.g. from Multimedia Broadcast and Multicast Service (MBMS) work, that the resource allocation (e.g. Modulation and Coding Scheme (MCS) and power) should be chosen according to the UE with the worst link budget. Existing solutions for such link adaptation of a channel received by multiple users all rely on regular feedback from the receivers (UEs). This means that the UE sends a signal or negative acknowledgement when it failed to receive the multi/broadcasted channel, so that the transmitter can adjust its resource allocation. Note, however, that
a.) the sender then has to "probe" the worst user resulting in reduced performance for the suffering receiver.
b.) the current UTRAN specifications do not support any link adaptation for MBMS carried over FACH.

Thus, current MBMS suffers from the problem depicted above. It is not desired to waste resources on frequent feedback on the reverse link, but only information on the link quality of the worst user is needed. It is also desired to also provide the worst user decent received quality without over-allocating resources.

JP 2003188818 relates to a mobile communication system which includes a base station and many user equipments capable of communicating with the base station in a cell occupied by the base station and where the base station can broadcast multicast multimedia broadcast service data to a plurality of pieces of the user equipment among many of the user equipment. The base station receives channel quality information of each user equipment from a plurality pieces of the user equipment and increases or decreases the transmission power of the base station to control the transmission power of the base station on the basis of the worst channel quality information among the channel quality information items received from a plurality pieces of the user equipment in order that the base station controls the transmission power to a plurality of the user terminals for broadcasting data. However, this solution assumes that each terminal is sending their "CQI".

Yet another problem occurs, for example in MBMS, which is a new service. The aim is to transfer data such as audio, video and interactive data simultaneously to several users in the downlink. The MBMS data is transmitted over a common transport channel such as the Forward Access Channel (FACH), which in turn is sent over the Secondary Common Control Physical Channel (S-CCPCH). The aim is also to use unacknowledged mode link layer, thereby relying only on Forward Error Correction (FEC).

The common channels do not have any closed loop power control mechanism. In fact, the FACH power is tuned with respect to the Common Pilot Channel (CPICH) power. These power-offset levels are usually obtained using static radio planning tools. Therefore, currently fixed offset is used between FACH and CPICH power levels. Even if the CPICH power level is tuned dynamically, the power-offset between FACH and CPICH remains fixed from the onset of the installation.

The power should be set according to the distribution of the MBMS users in the cell. Ideally the transmit power level should be optimum in a way to provide adequate quality to all the broadcast/multicast recipients, while at the same time prevents unnecessary interference to other users and to other cells.

The current solution of fixed power setting is designed for the worst possible scenario. The existing method does not take into account the dynamics in the system such as varying load and coverage.

Drawbacks include:
Too high power setting leads to unnecessary interference to the own cell users as well as to users in the neighboring cells.
Similarly very low power level may prevent some users from correctly receiving the broadcast data due to higher block error rate at the user equipment (UE) receiver. Low power level may even cause demodulation problems at the receiver.
Since MBMS utilizes unacknowledged mode link layer therefore optimum power setting method providing adequate quality is of great significance.

SUMMARY OF THE INVENTION

Thus, a problem to be solved by the present invention is to reduce wasting resources on frequent feedback from user equipments to the network on the uplink with respect to the link quality between the user equipment and the network.

Thus, as it will be described below, based on the transmitted link quality parameter and the link quality measured by the user equipment, the network adapts communications parameters and enhances the communication.

Another problem to be solved is fixing common channel power setting designed for particular load figure and coverage.

The advantages of the invention include:
The transmitter retains its freedom to allocate resources and MCS, depending on its local resource pools.
The link adaptation can be performed without loss of data integrity by probing the receivers' link quality prior to a change in the MCS and resource allocation strategy.
The adaptive power setting insures that the power transmitted to the MBMS users is adequate enough; thereby conserving the power for other channels and services.
In low load cases, the MBMS power is reduced proportionally, which in turn reduces the interference to the neighboring cells leading to high overall system capacity.

Though in practice the MBMS coverage can shrink owing to high system load since MBMS users far out in the cell will experience bad CPICH quality. Similarly, the MBMS coverage can also vary due to other factors such as user mobility. However, an operator would like to maintain the desired MBMS coverage irrespective of the system load. By introducing an outer loop power control on the FACH, the power level is adjusted so that the intended coverage is sustained.

The common channels consume significant part of the power budget, which is already a scarce resource. Correct power estimation would prevent unnecessary retransmissions and congestion control actions, leading to more stability both in terms of system load, processing and signaling.

The problems are solved and advantages are achieved by means of a method for transmitting data flows between a network element and a number of receivers over a first channel. The method comprises the steps of: performing a link adaptation for the transmission of a data flow by the network element, and transmitting the data flow over the first channel, transmitting a channel quality indication required for reception of the data flow on a second channel, receiving by the receivers the channel quality indication, measuring a link quality by the receivers by monitoring a pilot channel, comparing the measured link quality with the received channel quality indication, and transmitting to the network element result of the comparison of the measured link quality with the received indication of the channel quality, if the result is lower than a predetermined value.

According to one embodiment the first channel is a High-Speed Downlink Shared Channel, HS-DSCH, for common, multicast and/or broadcast traffic and the second channel is High Speed Shared Control CHannel (HS-SCCH).

According to one embodiment the receivers with different link quality are grouped together, thus the network can maintain different shared flow groups.

In one embodiment, the network element initiates a request for the receivers that share a flow to transmit their channel quality information, in such a way that the network element adjusts its link adaptation, and restricts a frequency at which a receiver is allowed to transmit the channel quality information at uplink to a value that is either broadcasted or transmitted via dedicated signaling.

According to another embodiment, the a transmitted data rate is increased by transmitting a higher channel quality value during a period of time without modifying the link adaptation and thereby the required link quality required for successful reception of the data flow, and if no channel quality reports are received from any receivers during a time period the network adjusting the link adaptation in such a way that more information bits per resource usage are transmittable.

Most preferably, the transmission of channel quality indication is used for resource allocation, comprising modulation and coding scheme, code and power-allocation used for a shared flow over the HS-DSCH.

The method may also comprise allowing a receiver only to send a channel quality report if the channel quality is reduced more than a certain amount compared to a previous report.

In one embodiment the network element comprises a Radio Network Controller (RNC) which periodically instructs all receivers on a Broadcast Channel (BCH) to report their measured quality on Common Pilot Channel (CPICH), whereby the RNC analyzes the measurement reports and instructs a base station to increase or decrease power on a Forward Access Channel (FACH) channel.

The invention also relates to a method in a user equipment, UE, in a communications network for reception of a data flow on a first channel. The method comprises the steps of: receiving by the UE an indication of channel quality from the network, measuring a link quality of the UE by monitoring a pilot channel, comparing the measured link quality with the received indication of the channel quality, and transmitting a result of the comparison of the measured link quality with the received indication of the channel quality, if the result is lower than a predetermined value. Preferably, the result may be used to decide ability of decoding a shared flow on the first channel. The UE may transmit the result over a Random Access Channel (RACH). Preferably the share flow is one of CCCH over HS-DCSH or MBMS.

In one embodiment, an UE having a channel quality indication equal to or above the received indication receives the share flow whenever there is a traffic intended for the UE.

According to another embodiment, the result is transmitted if a value of the result is reduced more than a certain amount compared to previous transmitted result.

The method may comprise reducing an uplink result report, by applying filtering used for handover measurements in the UE, whereby the UE only reports results below a broadcasted channel quality with a margin, and for a time period.

In one embodiment, the UE is MBMS enabled. Thus, the transmission power is altered based on the MBMS enabled UE's distance to a base station. Accordingly, the UE measures and reports the quality ($E_c/I_o$) of a common pilot channels, CPICH, periodically.

The invention also concerns a method for transmitting a data flow from a network element to a number of receivers over a first channel. The method comprises the steps of: performing a link adaptation for the transmission of a data flow by the network element, and transmitting the data flow, transmitting an indication of the channel quality required for reception of the data flow, on a second channel, receiving information about a link quality by the network element, the information comprising a difference in the transmitted channel quality indicator and a measured link quality in the receivers, and if needed, adjusting by the network element modulation and coding scheme or transmission power based on the information.

The invention also relates to a network element for transmitting dataflow over a first channel to be received by a number of user equipments (UEs). The network element comprises: a control unit configured to for perform a link adaptation, a transmitter for transmitting the data flow on first channel and a channel quality indicator on a second channel and a receiver arrangement for receiving information from the user equipments about link quality of the UEs compared with the transmitted channel quality and the control unit further being configured to operatively make adjustments to transmission parameters. The network element may further comprise means for instructing a transceiver to alternate a power on transport channel by a certain margin based on a distribution of the UEs in a network cell.

The invention also relates to a user equipment, UE, for use in a communications network, the UE comprising: a processing unit configured to run instruction sets for operating the communication part of the equipment, at least one memory unit, a user interface unit, and a communication interface for communicating with the communications network. The communication interface is configured to receive a data flow in over first channel and a channel quality indicator over a second channel, the processing unit being configured to measure a link quality of the UE, and means to compare the link quality of the UE with the received the channel quality indicator and transmit result of the comparison to the network.

BRIEF DESCRIPTION OF THE DRAWINGS

The present invention will be described in further detail with reference to attached drawings illustrating exemplary embodiments, in which.

DETAILED DESCRIPTION

The present invention according to the first general embodiment assumes that some or all of Common Control Channel (CCCH), Common Traffic Channel (CTCH), or MBMS channels, and further MBMS Control Channel (MCCH), Multicast Signal Channel (MSCH) and MBMS Traffic Channel (MTCH) are mapped on HS-DSCH. It also applies in a case when the dedicated DCCH and DTCH are mapped over HS-DSCH through MAC-c.

There is no single characterization of the channels above. Through this description, the term "Shared Flow" will be used to characterize CCCH (Common Control Channel), CTCH (Common Traffic Channel), MCCH, MSCH, MTCH, as well as "MAC-c flows", when DCCH+DTCH (Dedicated Control Channel+Dedicated Transport Channel) are mapped over MAC-c. Preferably, the flows are characterized by the fact that multiple users need to be able to receive the Shared Flow.

In the following example, the invention will be described in a non exclusive manner with reference to HS-DSCH, but it is appreciated that the teachings of the invention can be applied in any communication network having ability for channel carrying the shared flow is e.g. a "shared channel" (HS-DSCH in UTRAN). Thus, it should be appreciated by a skilled person, that the invention can be applied in any communications networks using link adaptation for broadcast services using shared channels.

In the first realized embodiment, a link-adaptation for HS-DSCH for common, multicast and broadcast traffic ("Shared Flows") is provided, without dedicated Channel Quality Information (CQI) reports from all receivers, and a dedicated channel that carries such reports.

Figure 1:
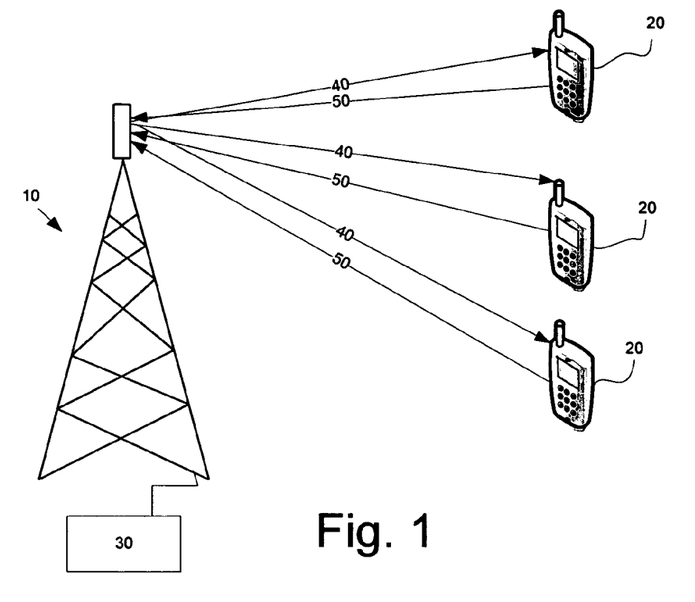
FIG. 1 is a schematic illustration of the invention according to a first embodiment.

The basic idea of the present invention according to the first embodiment is illustrated in FIG. 1. In this case the sender provides (sends/broadcasts) a CQI report 40 in the forward direction, to the multiple receivers 20. The receivers 20, in this case user equipments (UE) can monitor the cell pilot(s), compare the broadcast CQI to their measured CQI and thereby judge if they can expect to successfully decode the shared flow, which is transmitted over another channel. The senders, in this case NodeB 10, still retain all freedom in its resource allocation, i.e. how it should map the CQI to the available resources and how it should code and modulate the transmission. As long as it is below a sent/broadcast CQI value.

In case of HS-DSCH, for example, following is achieved:
  An HS-DSCH capable UE has capabilities to measure its Down Link (DL) CQI also in cases when it does not have an uplink (HS-DPCCH) to report CQI upon.
  All the tools for elaborate link-adaptation are available for HS-DSCH, if only the network knows the CQI of the UEs. Based on a CQI, the network can then choose which MCS, codes and power to use.
  The HS-DSCH-capable UEs with CQI measurement capability can autonomously check if the current CQI on the common HS-DSCH resource in question is higher than its own CQI.

The CQI level required for successful reception of the shared flow on the shared data channel is e.g. sent on another downlink channel in parallel to the shared downlink data channel. In UTRAN, the CQI level required for successful reception may be transmitted on the HS-SCCH channel.

UEs having a CQI less than the CQI signaled in the downlink need to report 50 to the network (over e.g. Random Access Channel (RACH)), so that the network can adjust its MCS+power+codes on the relevant resource portion.

Consequently, using the invention, the network can use link adaptation so that the resource allocation fits the UEs that listen to the common/broadcast/multicast (Shared Flow) traffic.

Feedback is received only from the "worst" UEs, and this feedback can potentially be received already before any decoding failures (of payload) have occurred.

Figure 2:
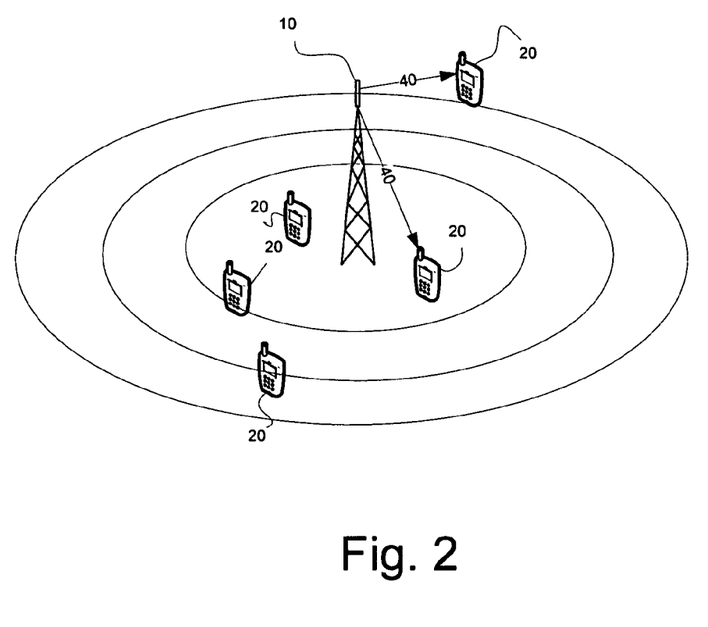
FIG. 2 is a schematic illustration of a network cell according to one embodiment.

The present invention is also illustrated by means of a simple, non-exclusive example in FIG. 2. Consider the schematic illustration in FIG. 2, where multiple UEs 20 are hosted by a cell.

The network maps a Shared Flow, e.g. CCCH over HS-DSCH (or MBMS in case of LTE etc.).

The network then broadcasts or signals 40 the CQI it uses for this CCCH.

UEs 20 monitor their CQI based on pilot signals from the Node B 10.

UEs that have a CQI below the CQI used by the network need to report their CQI to the Node B. UEs having a CQI equal to or above the broadcast/signaled CQI shall be able to receive the CCCH over HS-DSCH whenever there is traffic intended for the user.

In the figure, assume that the network sends with a "CQI=1". This means that all UEs in the cell can be reached. However, if the "Shared Data Flow" is targeted to the four UEs closest to the Node B, then the network can use a "CQI=3".

The network can maintain different shared flow groups: Terminals with good link quality are grouped together, while terminals with worse link quality are placed in a different common group.

There may occur different network actions of how to adapt to the "right" CQI for a "Shared Data Flow". These actions may include:

1. The network signals or broadcasts the CQI value used as a basis for the resource allocation, i.e. MCS, code and power-allocation used for a "shared flow" over HS-DSCH.
2. Different "FACH groups" (identified by an H-RNTI for each group) may be assigned different CQI levels. UEs having a low CQI could be moved from one group to another, by changing its H-RNTI.
3. The network initiates a request for the users in an H-RNTI group (that share a "flow") to transmit their CQI information, such that the network can adjust its link adaptation. As a particular method, the network could request all UEs having a CQI below a certain value to report to the network.
4. As a way to minimize the signaling load in uplink the frequency at which the UE is allowed to transmit the CQI information is restricted to a value that is either broadcasted or transmitted via dedicated RRC signaling.
5. As a further way to reduce the signaling load in uplink the UE is only allowed to send a CQI report if the CQI has been reduced more than a certain amount compared to the last time the UE transmitted a CQI report. This can be combined with the previous embodiment.
6. Another approach to reduce the UL CQI reports is to apply similar filtering as used for handover measurements in the UE. This means that the UE shall only report poor CQI once the measured CQI is below the broadcasted CQI with certain margin (hysteresis) and for a certain time period (time to trigger). This can also be used in combination with 4 and 5.
7. As a way to detect if the transmitted data rate (i.e. improved link quality of the receivers) can be increased (e.g. due to that UEs have moved or changed cell) the network can "probe" by transmitting a higher CQI value during some time without increasing the transmitted data rate. If no CQI reports are received from UEs during some time the network will increase the transmitted data rate. Alternatively the network can stepwise increase the broadcasted CQI until a CQI report is received from at least one UE to find the CQI of the UE with the worst link before increasing the data rate. This embodiment facilitates link adaptation without sacrificing data integrity, because the CQI of the receivers can be tested before a more aggressive resource allocation and MCS is taken into use.

Thus, more generally a network having a transceiving network element, for transmitting a data flow from the network element to one or several user equipments receiving the data flow, implementing the invention according to a first aspect performs:

link adaptation by the network element and broadcasts or signals its level of link-adaptation to the user equipments, and the user equipments monitor their link quality from the network element to the terminal, and compare its link quality with the received information on the level of link adaptation performed by the network.

Moreover, the UE reports to the network if the CQI of the UE is too low, or reports to the network element if the reported link quality value exceeds the measured link quality value. A difference between the measured link quality value and the reported link quality value exceeds a certain threshold (configured by the network element). The network may adjust its link adaptation and adjusts its broadcasted or signaled link quality value. The network may re-direct a UE to a different shared resource, if the UE has a too low CQI, e.g. a different H-RNTI over HS-DSCH. The CQI may be broadcast over a broadcast channel (BCH). The CQI is signaled on the HS-SCCH formats.

According to another generalized embodiment a network element comprises: means for instructing user equipments on a channel to report a measured quality, processing arrangement means for analyzing said measured quality reports, and means for instructing a transceiver to alternate a power on transport channel by a certain margin based on a distribution of the UEs in a network cell.

In another exemplary embodiment an MBMS enabled UE is the receiver of the information from the base station (Node B). Referring again to FIG. 1, the Radio Network Controller (RNC) 30 periodically instructs 40 all MBMS users 20 on the Broadcast Channel (BCH) to report their measured quality on CPICH. The RNC analyzes these measurement reports and instructs the Node-B 10 to increase or decrease the power on the FACH channel by certain margin. According to this embodiment the power is reduced if MBMS users are close to the base station. Similarly the power is increased if users are distributed far out in the cell. Therefore, the power is set according to the distribution of the MBMS users in the cell.

The embodiment will be described with reference to the following assumptions:

CPICH Quality Reporting

CPICH Tuning

The UE is able to measure and report the quality of common channels periodically. The common channel quality measurement such as CPICH $E_c/I_o$ is already known and the measurement can also be done in the idle mode. Similarly the specification also allows the UE to periodically report the CPICH quality measurement to the RNC using RRC signaling. The UE without a dedicated link can report the quality on Random Access Channel (RACH). Hence the CPICH quality of all the users including MBMS users is available at the RNC.

The power of FACH on which MBMS data is transmitted, is tuned with respect to the CPICH power. Therefore, it is assumed that the CPICH power is properly tuned in such a way that most of the users (e.g. 95%) remain satisfied. A user is satisfied provided its received signal quality (e.g. $E_c/I_o$), which is measured on a common channel such as CPICH, is above a well-defined threshold ($\gamma$). The threshold is chosen such that the demodulation requirements are fulfilled.

All users including MBMS users report their CPICH quality ($E_c/I_o$) to the RNC. As stated in the assumption the CPICH power is tuned such that the CPICH quality of almost all users is above the desired threshold ($\gamma$). The RNC uses the reported quality and other information to compute the power for the MBMS data as described below. The main aim is to insure that power allocated should satisfy the quality of the furthest MBMS user in the cell.

Let $$\left(\frac{E_c}{I_o}\right)_N^x$$

be the $x^{th}$ percentile of the CPICH quality of all the users including MBMS users in the cell. Let $$\left(\frac{E_c}{I_o}\right)_M^y$$

be the $y^{th}$ percentile of the CPICH quality of only MBMS users in the same cell.

The RNC estimates an offset $\delta$ [dB] according to the following expression:

$$\delta = \left(\frac{E_c}{I_o}\right)_M^y - \left(\frac{E_c}{I_o}\right)_N^x [dB] \quad (1)$$

An operator can set suitable values of x and y. A smaller value such as $5^{th}$ percentile or even lower value is recommended for both x and y since that would correspond to the quality reported by the worst users.

In (1) the offset $\delta$ will vary due to the change in the radio conditions of the existing users, the arrival of the new users or due to the departure of the existing users.

The RNC uses this offset ($\delta$) to estimate the transmitted power of the MBMS users ($P_{MBMS}$) expressed in dBm as follows:

$$P_{MBMS} = P_{CPICH} + \delta + \rho [dBm] \quad (2)$$

Where $P_{CPICH}$ [dBm] is the properly tuned transmitted CPICH power. A service factor $\rho$ [dB] is added to account for the amount of data, quality of service requirements etc. The service factor ($\rho$) is a function of the target Carrier to Interference Ratio ($CIR_{target}$), which depends upon the service.

Figure 5:
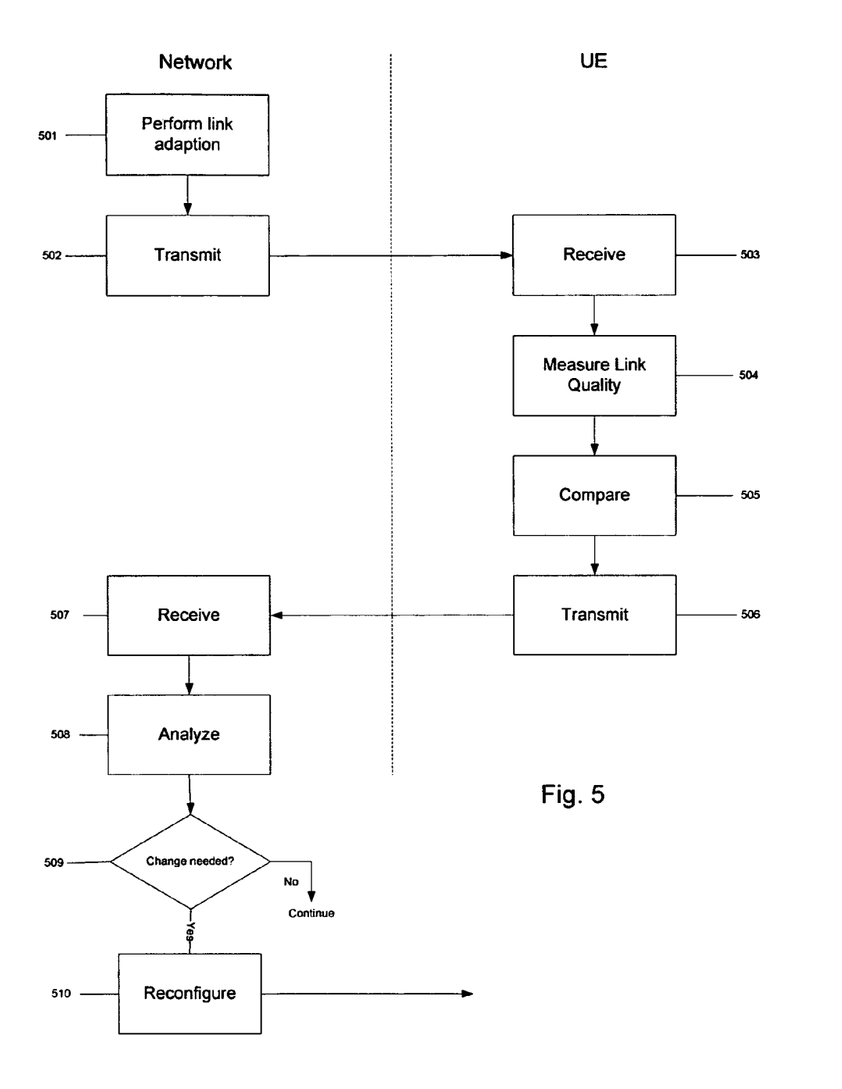
FIG. 5 illustrates a method according to the present invention.

The proposed scheme is indeed a slow outer loop power control to cope up with dynamic situations such as large-scale shadow fading, varying load and coverage scenarios. FIG. 5 illustrates in a schematically block diagram the main steps of the method according to the present invention. The flow diagram is divided between the network side and the receiver side.

501: The infrastructure node performs the link adaptation,
502: and transmits the channel quality indicator to the UE over a control channel,
503: the UE receives the level of link adaptation,
504: the UE measures its link quality,
505: the UE compares the link quality of it with the received channel quality indicator,
506: the result is transmitted back to the network,
507: the infrastructure node receives the information about the link quality,
508: the information which comprises a difference in the transmitted link adaptation and the measured link quality of the UE is analyzed, and
509: if there is need for the adaptation of the level,
510: the infrastructure node reconfigures transmission parameters as mentioned earlier.

Figure 3:
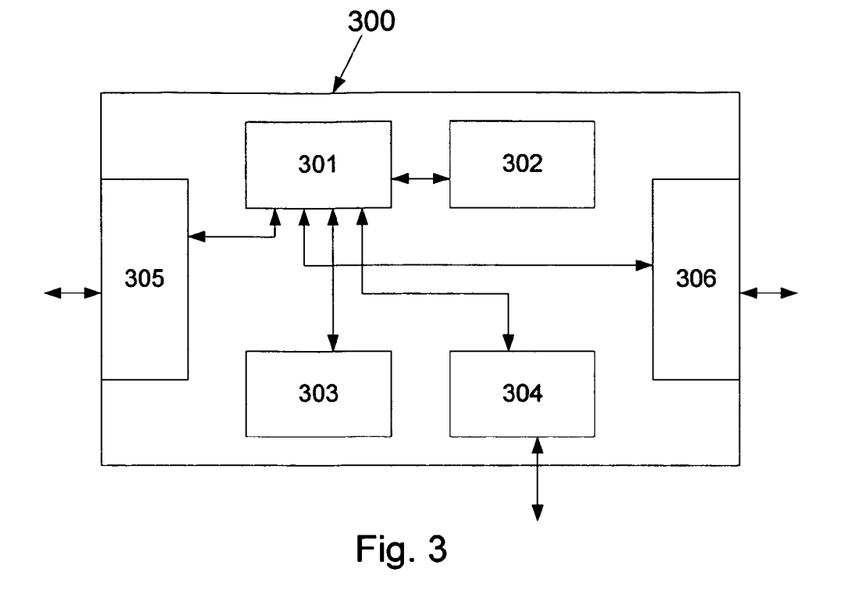
FIG. 3 illustrates schematically a user equipment according to the present invention.

FIG. 3 illustrates in a schematically block diagram a user equipment 300 according to the present invention. A processing unit 301 (e.g. a processor) is arranged to run instruction sets for operating the communication part of the equipment. The processor 301 in turn may use at least one memory unit 302, 303 of volatile or non-volatile solution (e.g. RAM or flash memory). A user interface unit 304 may interact with a user of the equipment using any suitable type of user interface equipment (e.g. a keyboard, a keypad and/or other types of buttons or even a voice controlled solution). The user equipment 300 may be arranged with a communication interface 305 for communicating with a communication network via a communication gateway 10 and it may further be arranged with a separate communication interface 306 for communicating with external or internal unit or devices; for instance if the user equipment 300 is part of a laptop the separate communication interface may be connected to internal laptop processing and communication parts for mediating information between the communication network and any application in the laptop.

The instruction set(s) may be inserted into the equipment at production time, downloaded using the wireless communication link to the telecommunication network, or downloaded using another link to a communication network, such as for instance but not limited to a synchronization link between the mobile phone 20 and a PC (not shown), a TCP/IP link between a laptop and a communication network (e.g. the Internet), and a wireless link (e.g. using at least one of Bluetooth, 802.11, 802.15, or 802.16 series of wireless communication protocols) between a PDA and a PC in turn connected for instance to the Internet.

The UE 300 receives the broadcasted information about the level of the link adaptation from the network by means of the communication interface 305. The information is handled, e.g. by means of the processor 301 which also may be used to monitor the link quality of the UE. Clearly, other means may be used to conduct the monitoring. When the result from the monitoring is obtained, again the processor (or other arrangement) compares link quality of the UE with the received information on the level of link adaptation performed. The result is the transmitted to the network.

Figure 4:
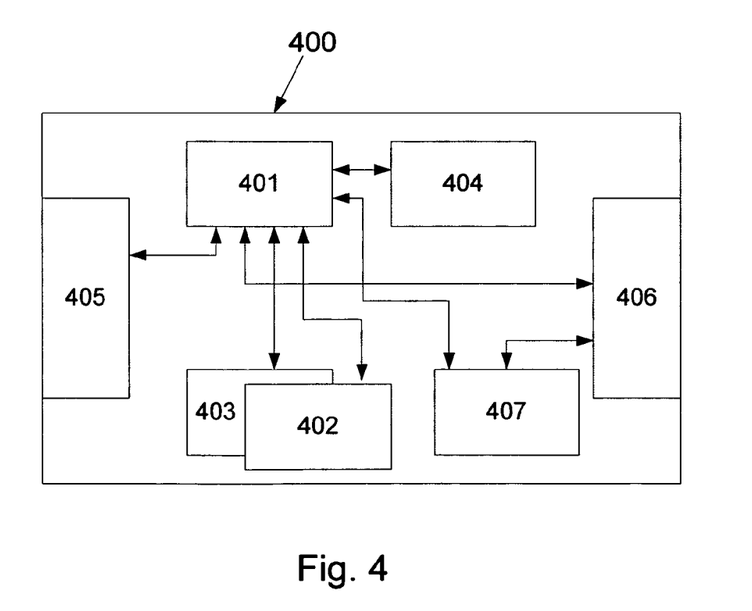
FIG. 4 illustrates schematically an infrastructure node according to the present invention.

FIG. 4 illustrates in a schematic block diagram an infrastructure node 400, e.g. a network element or base station, according to the present invention. A processing unit 401 handles communication data and communication control information. The infrastructure node 400 further comprises a volatile (e.g. RAM) 402 and/or non volatile memory (e.g. a hard disk or flash memory) 403, and an interface unit 404. The infrastructure node 400 may further comprise a downstream communication unit 405 and an upstream communication unit 406, each with a respective connecting interface (not shown). All units in the infrastructure node can communicate with each other directly or indirectly through the processing unit 401. Software (instruction sets) for handling communication to and from the mobile units attached to the network is at least partly executed in this node and may be stored in the node as well; however, the software may also be dynamically loaded upon start of the node or at a later stage during for instance a service interval. The software can be implemented as a computer program product and distributed and/or stored on a removable computer readable media, e.g. diskette, CD (Compact Disk), DVD (Digital Video Disk), flash or similar removable memory media (e.g. compactflash, SD secure digital, memorystick, miniSD, MMC multimediacard, smartmedia, transflash, XD), HD-DVD (High Definition DVD), or Bluray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the infrastructure node).

The infrastructure node 400 is configured to transmit data flow which is received by the UEs. A control unit, e.g. the processor 401 computes the level of link adaptation and transmits the information through down stream communication unit 405 to the UEs. The response, as described earlier, is received by the same communication unit from the UEs. The response includes the level of link quality compared with the link quality of the UE. The processor then performs a link adaptation based on the received information. The processor may also transmit a signal instructing the UEs on a channel to report the measured quality, analyzing the measured quality reports, and instructing the communications units to alternate the power on transport channel by a certain margin based on a distribution of the UEs in the network cell. Of course, other logic may be used instead of the processor to conduct all or parts of the above mentioned duties.

It should be noted those terms specific for special network standards are given as examples in the embodiments and similar wordings for entities and items having same functionality are not excluded from the invention.

| Abbreviations | |
| --- | --- |
| BCH | Broadcast Channel |
| CCCH | Common Control Channel |
| CIR | Carrier-to-Interference Ratio |
| CPICH | Common Pilot Channel |
| CCPCH | Common Control Physical Channel |
| CQI | Channel Quality Indicator |
| DCCH | Dedicated Control Channel |
| DTCH | Dedicated Transport Channel |
| $E_c/I_o$ | Received signal to noise ratio |
| FACH | Forward Access Channel |
| FEC | Forward Error Correction |
| HS-DSCH | High-Speed Downlink Shared Channel |
| HS-SCCH | High Speed Shared Control CHannel |
| H-RNTI | HS-DSCH Radio Network Transaction Identifier |
| MCS | Modulation and Coding Scheme |
| MBMS | Multimedia Broadcast and Multicast Service |
| MCCH | MBMS point-to-multipoint Control Channel |
| MSCH | MBMS point-to-multipoint Scheduling Channel |
| MTCH | MBMS point-to-multipoint Traffic Channel |
| P-CCPCH | Primary Common Control Physical Channel |

| Abbreviations | |
| --- | --- |
| PCH | Paging Channel |
| RACH | Random Access Channel |
| RNC | Radio Network Controller |
| RRC | Radio Resource Control |
| S-CCPCH | Secondary Common Control Physical Channel |
| WCDMA | Wideband Code Division Multiple Access |
| UE | User Equipment |
| UTRAN | UMTS Terrestrial Radio Access Network |
| 3GPP | $3^{rd}$ Generation Partnership Project |

The invention claimed is:

1. A method in a user equipment (UE) in a communications network for reception of a data flow on a first channel, the method comprising the steps of:

receiving by said UE on a second channel an indication of a channel quality required for reception of the data flow from said network, wherein said UE is Multimedia Broadcast Multicast Service (MBMS) enabled and transmission power is altered based on said MBMS enabled UE's distance to a base station, measuring a link quality of the UE by monitoring a common pilot channel (CPICH), wherein the UE measures and resorts the quality ($E_c/I_o$) of the CPICH periodically, comparing said measured link quality with said received indication of the channel quality required for reception of the data flow, and transmitting a channel quality report comprising information about the link quality to said network, if said measured link quality is lower than said received indication of the channel quality required for reception of the data flow, wherein the power for the UE is computed using:

$$P_{MBMS} = P_{CPICH} + \delta + \rho [dbm]$$

Wherein $P_{CPICH}$ [dBm] is a properly tuned transmitted CPICH power

ρ a service factor $$\delta = \left(\frac{E_c}{I_o}\right)_M^y - \left(\frac{E_c}{I_o}\right)_N^x [dB],$$

is an offset
Wherein $$\left(\frac{E_c}{I_o}\right)_N^x$$

is $x^{th}$ percentile of the CPICH quality of all the users in a cell and $$\left(\frac{E_c}{I_o}\right)_M^y$$

is $y^{th}$ percentile of the CPICH quality of only MBMS users in said cell.

2. The method of claim 1, using a result of said comparing to decide ability of decoding said data flow on said first channel.

3. The method of claim 2, wherein said data flow is one of CCCH over HS-DCSH or MBMS.

4. The method of claim 2, wherein when the measured link quality is equal to or above said received indication of channel quality required for reception of the data flow, the UE receives said data flow whenever there is a traffic intended for said UE.

5. The method of claim 1, transmitting said channel quality report over a Random Access Channel (RACH).

6. The method of claim 1, comprising transmitting said channel quality report if a value of said measured link quality is reduced by more than a certain amount compared to the last time the UE transmitted a channel quality report.

7. The method of claim 1, comprising applying filtering used for handover measurements in the UE, whereby the UE only reports results below a broadcasted channel quality with a margin, and for a time period.

8. The method of claim 1, wherein the UE uses a Random Access Channel, RACH, for said reporting.

9. The method of claim 8, comprising tuning CPICH power in such a way that a received signal quality measured on the common channel is above a well-defined threshold ($\gamma$).

10. The method of claim 1, wherein said channel quality report comprising information about the link quality is transmitted to said network if said measured link quality is lower than said received indication of the channel quality required for reception of the data flow by a predetermined value.

11. The method of claim 1, wherein said information about the link quality comprises a difference between said received indication of the channel quality required for reception of the data flow and said measured link quality.

12. The method of claim 1, wherein said information about the link quality comprises said measured link quality.

13. A user equipment (UE) for use in a communications network, the UE comprising:
- a processing unit configured to run instruction sets for operating the communication part of the equipment;
- at least one memory unit;
- a user interface unit;
- a communication interface for communicating with the communications network, wherein said communication interface is configured to receive a data flow over a first channel and to receive an indication of a channel quality required for reception of the data flow over a second channel, said processing unit being configured to measure a link quality of the UE by monitoring a common pilot channel (CPICH), wherein the processing unit is configured to measure and resort the quality ($E_c/I_o$) of the CPICH periodically, and to compare said measured link quality of said UE with said received indication of the channel quality required for reception of the data flow and said communication interface further being configured to transmit a channel quality report comprising information about the link quality to said network for adjustments of transmission parameters, if said measured link quality is lower than said received indication of the channel quality required for reception of the data flow, wherein said UE is Multimedia Broadcast Multicast Service (MBMS) enabled and transmission power is altered based on said MBMS enabled UE's distance to a base station and, wherein the power for the UE is computed using:

$$P_{MBMS} = P_{CPICH} - \delta\rho [dBm]$$

Wherein
$P_{CPICH}$ dBm is a properly tuned transmitted CPICH power
$\rho$ a service factor $$\delta = \left(\frac{E_c}{I_o}\right)^y_M - \left(\frac{E_c}{I_o}\right)^x_N [dB],$$

Wherein $$\left(\frac{E_c}{I_o}\right)^x_N$$

is $x^{th}$ percentile of the CPICH quality of all the users in a cell and $$\left(\frac{E_c}{I_o}\right)^y_M$$

is $y^{th}$ percentile of the CPICH quality of only MBMS users in said cell.

* * * * *